United States Patent
Zorn et al.

(10) Patent No.: US 12,254,008 B2
(45) Date of Patent: Mar. 18, 2025

(54) RESPONDING TO TASK PROMPT ON DECLARATIVE CODE USING LANGUAGE MODEL

(71) Applicant: Microsoft Technology Licensing, LLC, Redmond, WA (US)

(72) Inventors: Benjamin Goth Zorn, Woodinville, WA (US); Carina Suzana Negreanu, Cambridge (GB); Neil Blunt Toronto, Cambridge (GB); Brian Paul Slininger, Seattle, WA (US); Andrew Donald Gordon, Cambridge (GB); Advait Sarkar, Cambridge (GB); Sruti Srinivasa Ragavan, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 17/849,056

(22) Filed: Jun. 24, 2022

(65) Prior Publication Data

US 2023/0418815 A1  Dec. 28, 2023

(51) Int. Cl.
*G06F 40/40* (2020.01)
*G06F 8/41* (2018.01)
*G06F 16/2452* (2019.01)
*G06F 40/20* (2020.01)

(52) U.S. Cl.
CPC ........ *G06F 16/24522* (2019.01); *G06F 8/427* (2013.01); *G06F 8/436* (2013.01); *G06F 40/20* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 8,321,833 B2 * | 11/2012 | Langworthy | G06F 8/31 717/114 |
| 10,474,961 B2 * | 11/2019 | Brigham | G06N 20/00 |
| 11,968,088 B1 * | 4/2024 | Yan | G06F 40/30 |
| 2007/0169039 A1 * | 7/2007 | Lin | G06F 8/34 717/146 |
| 2010/0269092 A1 | 10/2010 | Dorman | |

(Continued)

OTHER PUBLICATIONS

Rohan Bavishi, Caroline Lemieux, Roy Fox, Koushik Sen, and Ion Stoica. 2019. AutoPandas: neural-backed generators for program synthesis. Proc. ACM Program. Lang. 3, OOPSLA, Article 168 (Oct. 2019) (Year: 2019).*

(Continued)

*Primary Examiner* — Jason D Mitchell
(74) *Attorney, Agent, or Firm* — Workman Nydegger

(57) ABSTRACT

The generation of a response to a task prompt that represents a task to perform on declarative code. The response is generated with the aid of a language model that was trained on imperative code. The declarative code includes declarations about data. A task prompt represents a task to perform on the declarative code. At least a portion of the declarative code and at least a portion of the task prompt are converted into input imperative code. The input imperative code is then caused to be provided as input to the language model, resulting in the language model generating output imperative code. At least a portion of the output imperative code is then converted into a response to the task prompt.

20 Claims, 8 Drawing Sheets

(56) References Cited

U.S. PATENT DOCUMENTS

| | | | | |
|---|---|---|---|---|
| 2014/0195466 A1* | 7/2014 | Phillipps | ............... | G06F 16/00 |
| | | | | 706/12 |
| 2016/0117364 A1 | 4/2016 | Jahankhani | | |
| 2016/0299748 A1* | 10/2016 | Scholz | ................ | G06F 8/427 |
| 2019/0156247 A1 | 5/2019 | Faulhaber, Jr. | | |
| 2020/0150937 A1* | 5/2020 | Smith | ................. | G06N 3/02 |
| 2021/0398524 A1* | 12/2021 | Gao | .................. | G10L 15/22 |
| 2023/0161945 A1* | 5/2023 | Vadapandeshwara | ................. | |
| | | | | G06F 40/166 |
| | | | | 715/234 |
| 2024/0135113 A1 | 4/2024 | Zorn | | |

OTHER PUBLICATIONS

Sumit Gulwani and Mark Marron. 2014. NLyze: interactive programming by natural language for spreadsheet data analysis and manipulation. In Proceedings of the 2014 ACM SIGMOD International Conference on Management of Data (SIGMOD '14). Association for Computing Machinery, New York, NY, USA, 803-814. (Year: 2014).*

International Search Report and Written Opinion received for PCT Application No. PCT/US2023/033331, Jan. 18, 2024, 14 pages.

Liguori, et al., "Can we generate shellcodes via natural language? An empirical study," Automated Software Engineering, Springer, US, Boston, vol. 29, No. 1, pp. 1-34, Mar. 5, 2022.

"International Search Report and Written Opinion Issued in PCT Application No. PCT/US23/023348", Mailed Date: Aug. 23, 2023, 12 Pages. (MS# 411616-WO-PCT).

Ragavan, et al., "GridBook: Natural Language Formulas for the Spreadsheet Grid", In Proceedings of the 27th ACM Symposium on Virtual Reality Software and Technology, Mar. 22, 2022, pp. 345-368.

U.S. Appl. No. 17/969,922, filed Oct. 20, 2022.

* cited by examiner

1. Prompt
   _____
2. # Python 3
3. import pandas as pd
4. df = pd.DataFrame()
5. df['Student'] = ['Anne', 'Bob', 'Chris', 'Dave'
6. 'Elle', 'Freda']
7. df['Test score'] = [45, 89, 95, 72, 80, 56]
8. # calculate the grades

*600*

```
Querying Codex; options = {
"engine": "davinci-codex-msft"
"maxTokens": 1024,
"temperature": 0,
"topProb": 1,
"numCompletions": 1
}

Codex response = {
  "id": "cmpl-
53vge034Ndt9vEZJdhwY1UldjHkzy",
  "object": "text completion".
  "created": 1651618416,
  "model": "davinci-codex:2021-08-03"
  "choices": [
    {
      "text": "df['Grade'] = df'Test
  score'].apply(lambda x: 'A' if x >= 90 else "B' if
  x >= 80 else 'C' if x >= 70 else 'D' if x >= 60
  else 'F')\n\nprint(df)",
      "index: 0,
      "logprobs": null,
      "finish reason": "stop"
    }
  ]
}
```

|   | A | B | C |
|---|---|---|---|
| 1 | Student | Test score | Grade |
| 2 | Anne | 45 | F |
| 3 | Bob | 89 | B |
| 4 | Chris | 95 | A |
| 5 | Dave | 72 | C |
| 6 | Elle | 80 | B |
| 7 | Freda | 56 | F |

CodeExcel

Prompt calculate the grades

[Query]

Response

OutputType: new column

Completion:
df['Grade']=df['Test score'].apply(lambda x: 'A' if x > = 90 else 'B' if x > = 80 else 'C' if x > = 70 else 'D' if x > = 60 else 'F')
print(df)

RESPONDING TO TASK PROMPT ON DECLARATIVE CODE USING LANGUAGE MODEL

BACKGROUND

Conventional large language models are deep neural networks that have on the order of billions (and fast approaching trillions) of parameters that may each be adjusted as the model is trained on textual training data. Such large language models are trained on large repositories of sequential text such as natural language text and/or imperative code. As an example, large language models can be trained on libraries of text collections, code files, or other sources of sequential text. Accordingly, such large language models can perform some tasks on a linear string of input text (also called a "prompt"). Large language models are sophisticated and can be very expensive to create, and thus the large language models are often provided in the form of a cloud service. Examples of large language models include GPT-3®, AlphaCode, and PaLM.

As an example, some conventional large language models can receive natural language text and generate an appropriate response. Thus, large language models are used to allow artificial intelligence to have a conversation with a human. As another example, some conventional large language models can generate imperative code using a prompt in the form of a natural language description of what the imperative code should be able to do. Such conventional large language models are thus adept at generating a linear sequence of output text based on a linear sequence of input text, such as natural language or imperative code.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the generation of a response to a task prompt that represents a task to perform on declarative code. The response is generated with the aid of a language model that was trained on imperative code. Thus, sophisticated language models that are trained on imperative code may also be used to perform tasks on declarative code, expanding the utility of such language models. Furthermore, users of applications that author declarative code may have significant aid in generating additional declarative code, which is particularly advantageous as such users may not be experienced programmers.

The declarative code includes declarations about data. In this description and in the claims, a declaration "about data" is defined as any one or more of the following: a declaration that defines data, a declaration that defines a relationship between data, and a declaration that define metadata about the data such as for example a description of presentation or layout. A task prompt represents a task to perform on the declarative code. At least a portion of the declarative code and at least a portion of the task prompt are converted into input imperative code. The input imperative code is then caused to be provided as input to the language model, resulting in the language model generating output imperative code. At least a portion of the output imperative code is then converted into a response to the task prompt. As an example, the response could be additional one or more declarations that modify or augment the declarative code.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 6 illustrates output imperative code that may be generated by the language model receiving the input imperative code of FIG. 5;

FIG. 7 illustrates a user interface that is similar to the user interface of FIG. 4, except that the boxed portion of the output imperative code of FIG. 6 has been converted into the response within the responds field, and the spreadsheet has been updated to include a new column with the desired new data;

DETAILED DESCRIPTION

Figure 1:
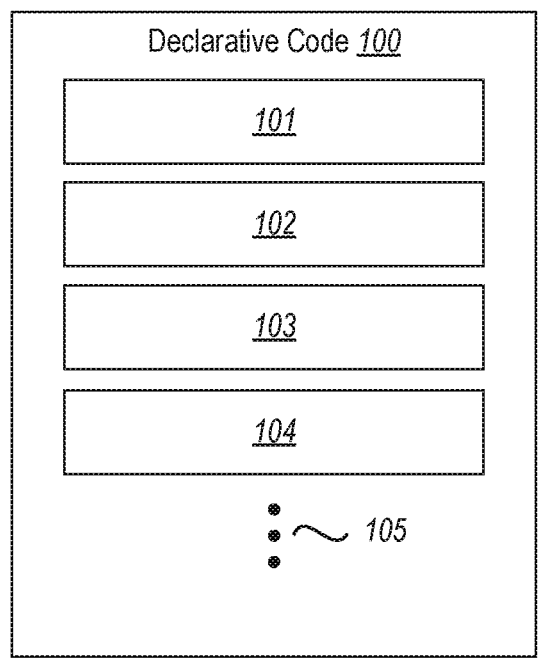
FIG. 1 illustrates an example of declarative code that includes multiple declarations about data.

The principles described herein relate to the generation of a response to a task prompt that represents a task to perform on declarative code. The response is generated with the aid of a language model that was trained on imperative code. Thus, sophisticated language models that are trained on imperative code may also be used to perform tasks on declarative code, expanding the utility of such language models. Furthermore, users of applications that author declarative code may have significant aid in generating additional declarative code, which is particularly advantageous as such users may not be experienced programmers.

The declarative code includes declarations about data. In this description and in the claims, a declaration "about data" is defined as any one or more of the following: a declaration that defines data, a declaration that defines a relationship between data, and a declaration that define metadata about the data such as for example a description of presentation or layout. A task prompt represents a task to perform on the declarative code. At least a portion of the declarative code and at least a portion of the task prompt are converted into input imperative code. The input imperative code is then caused to be provided as input to the language model, resulting in the language model generating output imperative code. At least a portion of the output imperative code is then converted into a response to the task prompt. As an example, the response could be additional one or more declarations that modify or augment the declarative code.

In this description and in the claims, a "language model" is any circuit that takes language as input and generates language as output. The term "language" is intended to be interpreted broadly as including any sequence of language components belonging to any language component set. As an example, the language component set could be that of any human language, or of any computer programming language. In this description and in the claims, the language components of the language component set could include characters, words, phrases, symbols, or the like, in any human and/or computer programming language. There is no restriction on the sequence of language components, but the sequence of language components will typically have meaning, such as natural language or imperative code. The language model was previously trained on input language to thereby adjust numerous parameter values of the model. As an example, the language model may be trained on large corpora of natural language and/or imperative code.

The principles described herein are not limited to the size of the language model, though most benefit may be obtained from well-designed language models that have a large number of parameter values. Currently, large language models have billions and approaching trillions of parameter values. With such large numbers of parameters, the language models can perform sophisticated tasks, such as generating imperative code from a task prompt. Large language models can even be used to allow an artificial intelligence to engage in fairly sophisticated conversations with humans. However, such large language models are very expensive to create and maintain, and thus are typically offered as a cloud service. In accordance with the principles described herein, the language models are leveraged to perform tasks in the context of declarative code.

FIG. 1 illustrates an example of declarative code 100. The declarative code includes multiple declarations. In the example of FIG. 1, the declarative code 100 includes four declarations 101, 102, 103 and 104. However, the ellipsis 105 represents that the principles described herein may be applied regardless of how many declarations that the declarative code 100 includes. The declarative code 100 may even have hundreds, thousands, or even more declarations, but a simple representation is illustrated in FIG. 1 to avoid overcomplicating the figures and description. Each declaration is about data. That is each declaration defines data, defines a relationship between the data, defines metadata about the data, or any combination thereof.

A spreadsheet is an example of declarative code. A spreadsheet includes a two-dimensional grid of cells. Each cell may either be empty, or filled. A filled cell either includes a value that was directly entered by a user, or an expression that is evaluated to an output value. That expression may reference other cells and receive as input the value defined in or output from those cells. Thus, the expression defines a relationship between values of the input cells and the output value. Alternatively, the expression may receive no input cells but still evaluate to an output value. Spreadsheets also contain metadata, for example, describing the presentation of the code and data. For example, a spreadsheet might highlight a row or column in bold font or color numbers below zero with the color red.

In an example described below with respect to FIGS. 4 through 7, the declarative code is a spreadsheet. However, the principles described herein are not limited to any particular type of declarative code. Another example of declarative code is a database, such as a relational database. A database is an organized structure that amounts to a collection of declarations that define data, relationship(s) between data, and/or metadata of the data. Other examples of declarative code include a web page, a collection of rules, or the like. Examples of declarative languages that express declarative code include HyperText Markup Language (HTML), eXtensible Markup Language (XML), Cascading Style Sheets (CSS), JavaScript Object Notation (JSON) and Structured Query Language (SQL). However, the principles described herein are not limited to the language in which the declarative code is expressed.

Figure 2:
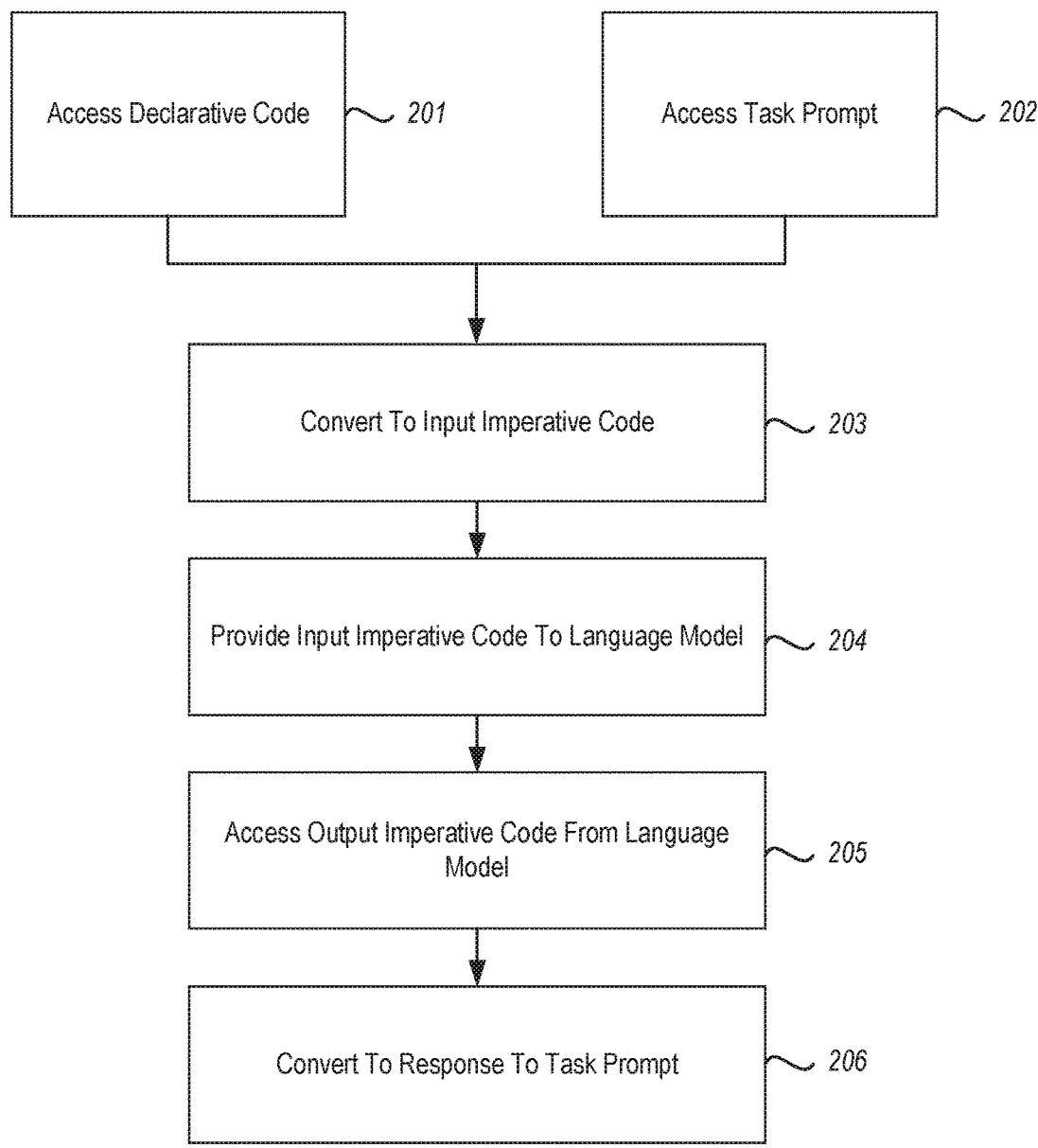
FIG. 2 illustrates a flowchart of a computer-implemented method for generating a response to a task prompt representing a task to perform on declarative code, in accordance with the principles described herein.

FIG. 2 illustrates a flowchart of a computer-implemented method 200 for generating a response to a task prompt representing a task to perform on declarative code, in accordance with the principles described herein. The method 200 may be performed once, or may be repeatedly performed. For example, there may be multiple rounds of a task prompt and getting results back, whereupon the user edits the task prompt to adjust the results.

Figure 3:
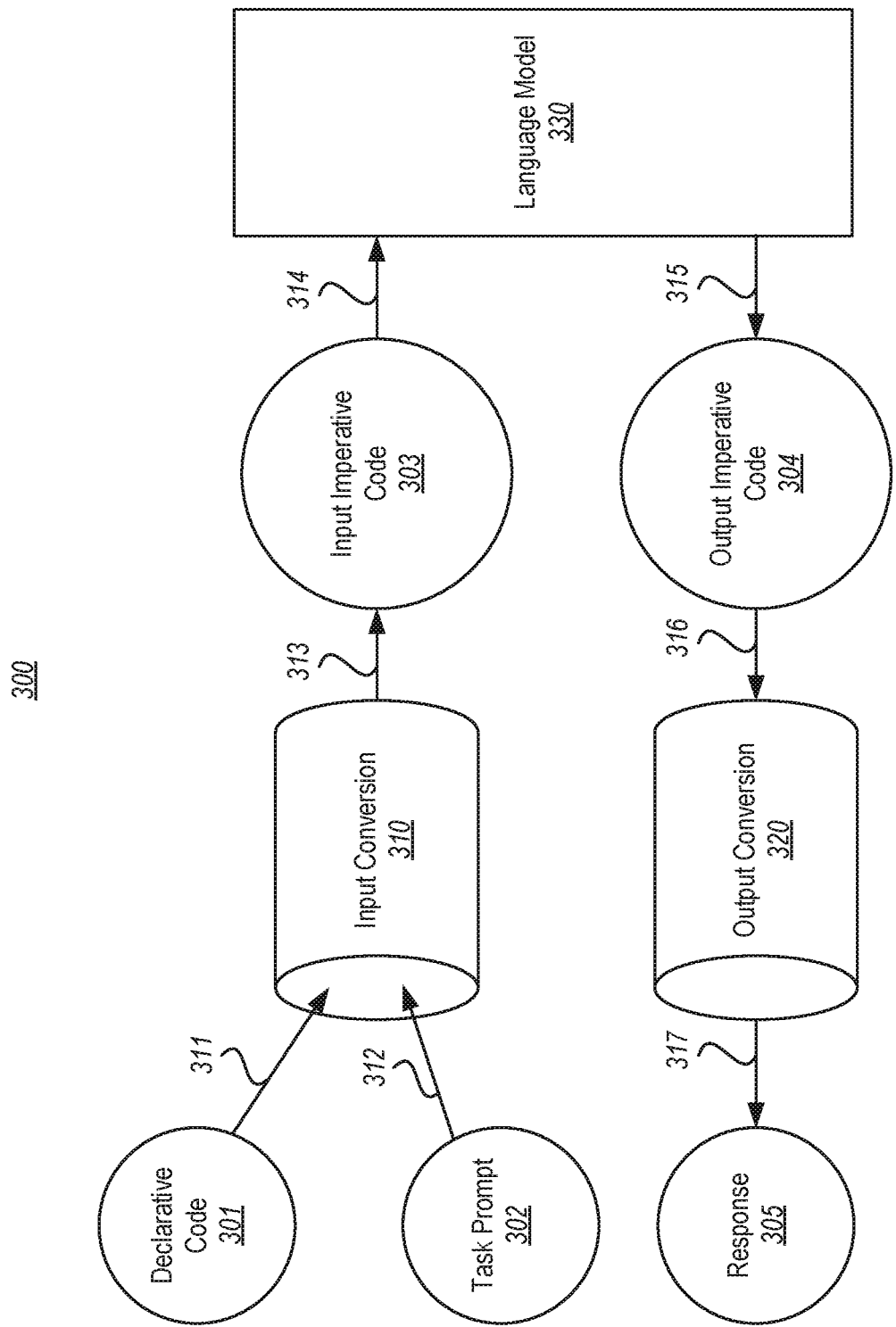
FIG. 3 illustrates an environment in which a response to a task prompt may be generated using the method of FIG. 2.

FIG. 3 illustrates an environment 300 in which a response to a task prompt is generated. As the method 200 of FIG. 2 may be performed within the environment 300 of FIG. 3, the method 200 of FIG. 2 will now be described with frequent reference to the environment 300 of FIG. 3. After the description of FIGS. 2 and 3, this description will provide a specific example of a task being executed upon declarative code in the form of a spreadsheet.

To begin the process, the method 200 includes accessing the declarative code (act 201) and accessing a task prompt representing a task to perform on the declarative code (act 202). Referring to FIG. 3, the input conversion component 310 accesses (as represented by arrow 311) the declarative code 301, and accesses (as represented by arrow 312) the task prompt 302. The declarative code 301 is an example of the declarative code 100 of FIG. 1. If the input conversion component 310 is performed by a computing system such as the computing system 1000 described below with respect to FIG. 10, the input conversion component 310 may be structured in accordance with the executable component 1006 of FIG. 10.

The method 200 then includes converting at least a portion of the declarative code and at least a portion of the task prompt into input imperative code (act 203). Referring to FIG. 3, the input conversion component 310 converts at least a portion of the declarative code 301 and at least a portion of the task prompt 302 into input imperative code 303. Arrow 313 represents the outputting of the input imperative code 303 by the input conversion component 310. In this description and the claims, the term "at least a portion of a particular item could include less than all of that particular item, but is broad enough to include potentially all of that particular item. Thus, "at least a portion of the text prompt" is broad enough to encompass all of the task prompt, as well as less than all of the task prompt.

In some embodiments, additional information may be used to generate the input imperative code 303. As an example, the input conversion component 310 itself may automatically generate problem-solution pairs that are to be fed to the language model and that are similar to a pairing of the task represented in the task prompt and a corresponding solution. This automatic generation of problem-solution pairs is called "multi-shot". It is very much like teaching a human what task is to be completed by showing prior task completions for similar tasks. Alternatively, or in addition, the input to the input conversion component 310 may includes user-specified constraints. As an example, such user-specified constraints may specify a maximum number of potential responses, a form in which the response should take, and so forth.

The method 200 then includes causing at least a portion of the input imperative code to be input into a language model (act 204). Referring to FIG. 3, the input imperative code 303 that is output from the input conversion component 310 is input (as represented by arrow 314) into the language model 330. In response, the language model 330 outputs (as represented by arrow 315) the output imperative code 304. In some embodiments, problem-solution pairs generated by the input conversion component 310 and/or user-specified constraints may also be fed as input to the language model 330.

The method 200 then includes accessing output imperative code generated by the language model in response to the language model operating upon the input imperative code (act 205). Referring to FIG. 3, the output conversion component 320 accesses (as represented by arrow 316) the output imperative code 304 that was generated by the language model 330 in response to the language model 330 operating upon the input imperative code 303. If the output conversion component 320 is performed by a computing system such as the computing system 1000 described below with respect to FIG. 10, the output conversion component 320 may be structured in accordance with the executable component 1006 of FIG. 10.

The method 200 then includes converting at least a portion of the output imperative code into a response to the task prompt (act 206). Referring to FIG. 3, the output conversion component 320 converts at least a portion of the output imperative code 304 to generate a response 305 to the task prompt 302. Arrow 317 represents the outputting of the response 305. The response 305 may be expressed in the declarative code domain. Accordingly, the output conversion component may act using compiler translation from an imperative code programming language to declarative code. Such compiler translation may be performed by static analysis of the imperative code as the imperative code exists in source code, intermediate code or binary code. In one embodiment, the output imperative code may be run to obtain the results in the declarative code domain.

From the user's perspective, the user has declarative code and input a task prompt representing a task that the user wants performed on the declarative code. The user then receives a response. That response is sophisticated and leverages the language model that is highly capable, but not conventionally used to operate upon declarative code. However, the user is permitted to stay in the declarative code domain, and does not need to recognize the sophistication of the language model that was used to generate the response, nor that the task and code was converted into the imperative code domain so as to leverage the capabilities of that language model. The user will simply realize that the response is more intelligently tailored towards the task prompt as applied to the declarative code.

Figures 4, 5:
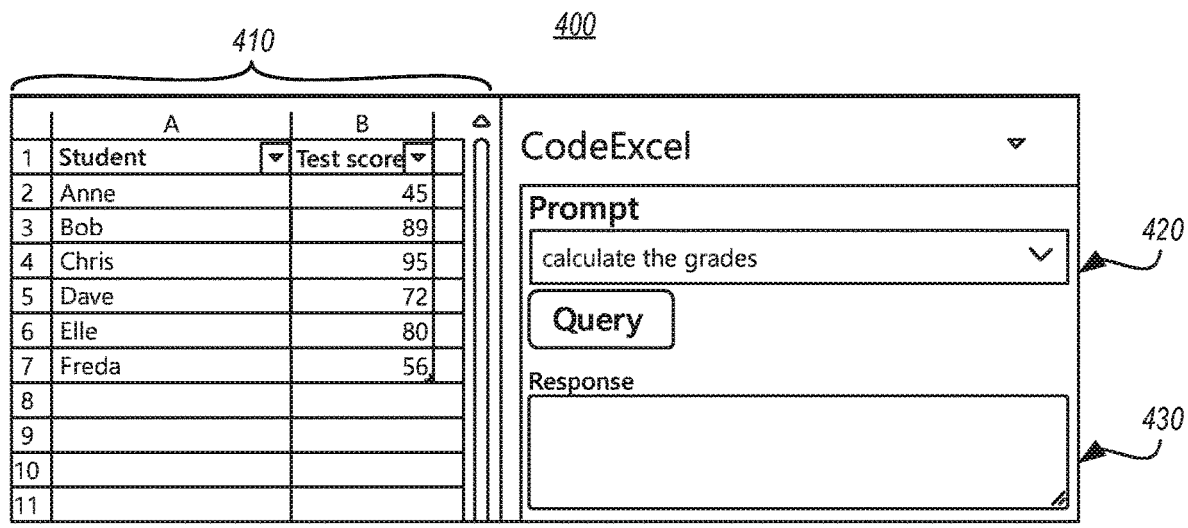
FIG. 4 illustrates a user interface that includes a declarative code portion that shows the spreadsheet that the task is to be performed on, a task prompt field in which a user may input a task prompt representing a task to perform on the declarative code, and a response field in which results of the task may be presented.
FIG. 5 illustrates an example of input imperative code that is generated by converting the spreadsheet and the task prompt of FIG. 4 into imperative code.

An example will now be provided in which a user enters a task to be performed on a spreadsheet. FIG. 4 illustrates a user interface 400 that includes a declarative code portion 410 that shows the spreadsheet that the task is to be performed on. The spreadsheet is relatively simple in this example and includes a table object (e.g., a Control+T table) having six rows for six students, a column A for the student's name, and a column B for the student's test score. This spreadsheet is an example of the declarative code 301 of FIG. 3.

The user interface also includes a task prompt field 420 in which the user enters a task prompt. In this example, the task prompt is the natural language expression "calculate the grades". The text "calculate the grades" in an example of the task prompt 302 of FIG. 3. Note that there is no explicit mention of anything like a "grade" in the spreadsheet. Thus, the generation of a grade given the spreadsheet will involve some semantic interpretation of the spreadsheet and the application of intelligence to the spreadsheet. As human beings, based on our school experience, we understand that the numerical test score values may be mapped to a particular grade, and that such grades tend to be letter grades ranging from A to F. The substantial intelligence offered by the language model has a good chance of accomplishing this task.

The user interface 400 also includes a results field 430 in which a response to the task prompt may be presented. The results that will be presented in the results field 430 is an example of the response 305 of FIG. 3. Alternatively, or in addition, the result could be the direct modification of the spreadsheet shown in the declarative code portion 410. Such modification of the spreadsheet is also an example of the response 305 of FIG. 3.

In the example of FIGS. 4 through 7, the task prompt is expressed using natural language. However, this need not be the case. The task prompt could be expressed using a particular language for expressing the task prompt. As an example, suppose that the declarative code was a database, the task prompt might then be expressed in natural language or in some query language (such as Structured Query Language—or SQL).

Returning to the example of FIGS. 4 through 7, the spreadsheet and the task prompt are then converted into input imperative code. FIG. 5 illustrates an example of input imperative code that is generated by converting the spreadsheet and the task prompt of FIG. 4 into imperative code. For clarity and ease of reference, line numbering is added in the input imperative code in FIG. 5, though the line numbering would not be present within the input imperative code itself. Line 1 labels the input imperative code as such. Line 2 is a comment line identifying the imperative programming language (here "Python 3"). Line 3 imports Pandas, which is a software library for Python used for data manipulation and analysis. Lines 1 to 3 might be automatically added by the input conversion component when generating the input imperative code.

Lines 4 to 7 are an imperative code representation of the spreadsheet. Line 4 establishes a dataframe that will be used to represent the Control+T table illustrated in the declarative code portion 410 of the user interface 400. Lines 5 to 6 are actually a single line that defines the values and column title from column A of the Control+T table. Line 7 is also a single line that defines the values and column title from column B of the Control+T table. More generally stated, the input conversion table may generate imperative code that establishes a data structure representing the spreadsheet table, and then provides an imperative code line that defines an array of values for each column. The principles described herein are not limited to the spreadsheet being a Control+T table. The input imperative code converts the table into an imperative code representation of the table.

Line 8 is an imperative code comment line that simply provides the natural language task prompt. Thus, the input conversion code can generate an imperative line of code that is a comment line that includes the literal task prompt. Thus, by adding appropriate lines of imperative code to include the task prompt, an imperative code representation of the spreadsheet, and additional enabling imperative code, the input conversion component generates imperative code that can be input into a language model that was trained on large corpora of natural language and imperative code.

This input imperative code is fed to the language model, which generates output imperative code. FIG. 6 illustrates a user interface 600 that illustrates output imperative code that may be generated by the input imperative code shown in FIG. 5. Here, the language model applied its intelligence in order to perform the task represented by the task prompt. Specifically, the imperative code includes a portion 601 that includes code that, if executed, adds a new column called "Grade"), and specifies the conditions for assigning each of the grades A, B, C, D and F, based on the test score. Here, the language model seemed to infer that a new column should be added called "Grade", the potential values for the column, and the mechanism to calculate the value of the column based on existing data. The output conversion component accesses this generated imperative code.

The output conversion component then generates a response within the declarative code domain using the output imperative code. FIG. 7 illustrates a user interface 700 that is similar to the user interface 400 of FIG. 4. However, here, the boxed portion 601 of the output imperative code 600 of FIG. 6 has been converted into the response within the responds field 430. The output conversion component determined that the appropriate way to incorporate that boxed portion into the spreadsheet was to create a new column in the Control+T table. That new column is named "Grade". In addition, the expression that determines the grade A, B, C, D or F is then associated with each row. That expression is "lambda x: 'A' if x>=90 else 'B' if x>=80 else 'C' if x>=70 else 'D' if x>=60 else 'F'".

Here, the OutputType is "new column". Thus, the response is for a new column to be created in the spreadsheet. Other types of output may be appropriate under other circumstances. As an example, a response may be to add a portion of the spreadsheet including potentially a new row, a new column, or a new table. Another response might be to change or add a formula to a cells or a group of cells. Other responses might be to assign a value to a cell or a group of cells. Responses could be any combination of these responses.

Thus, in this case, the user was able to express in simple natural language (in this case "calculate the grades") to be performed against declarative code (in this case, the spreadsheet). However, this is just one example of the great power that is leveraged herein in allowing large language models to be used against declarative code. To just give a brief sense of the infinite breadth of tasks that might be performed, a few examples further examples will be provided. As another example, in a spreadsheet listing positions of various towns, the user might input a task "Which is the northernmost town that also a nation's capital?". This could result in a resorting of the rows, the addition of column showing whether or not the town is a capital, the presentation of the answer in text form, the highlighting of a row, or the like. In a spreadsheet showing products and sales, there might be a task "Sort the products based on most revenue?" or "How much gross profit has there been for each product."

Because the capabilities of the language model are significant, and because the principles described herein provide a bridge between the language of declarative code and the language of the language model (e.g., imperative code), the principles described herein pull the capabilities of the language model into the declarative code domain.

Figure 8:
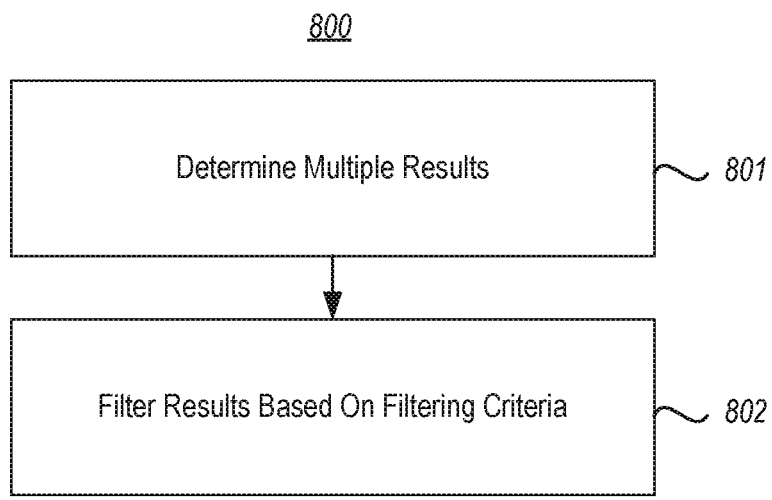
FIG. 8 illustrates a flowchart of a method for filtering multiple results generated by the language model.

There may be multiple possible responses generated by the language model. FIG. 8 illustrates a flowchart of a method 800 for processing multiple results generated by the language model by using filtering. Upon determining that there are multiple results generated by the language model (act 801), the method 800 includes filtering the results generated by the language model using a filtering criteria (act 802). That filtering criteria could be, for instance, a confidence score that is based on token metadata resulting from tokens that make up the output imperative code. Filtering criteria could also be based on a user-specified constraint. Filtering may also be based on whether the output imperative code for any given result can execute.

Figure 9:
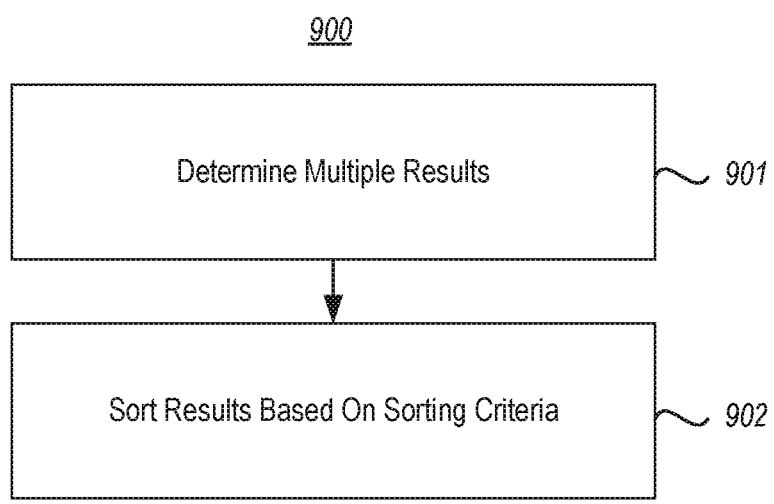
FIG. 9 illustrates a flowchart of a method for sorting multiple results generated by the language model.

Alternatively or in addition to the filter described with respect to FIG. 8, sorting of multiple results may also be performed. FIG. 9 illustrates a flowchart of a method 900 for processing multiple results generated by the language model by using sorting. Upon determining that there are multiple results generated by the language model (act 901), the method 900 includes sorting the results generated by the language model using a sorting criteria (act 902). That sorting criteria could be, for instance, a confidence score that is based on token metadata resulting from tokens that make up the output imperative code. Sorting criteria could also be based on a user-specified constraint. Sorting may also be based on whether the output imperative code for any given result can execute.

Because the principles described herein are performed in the context of a computing system, some introductory discussion of a computing system will be described with respect to FIG. 10. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
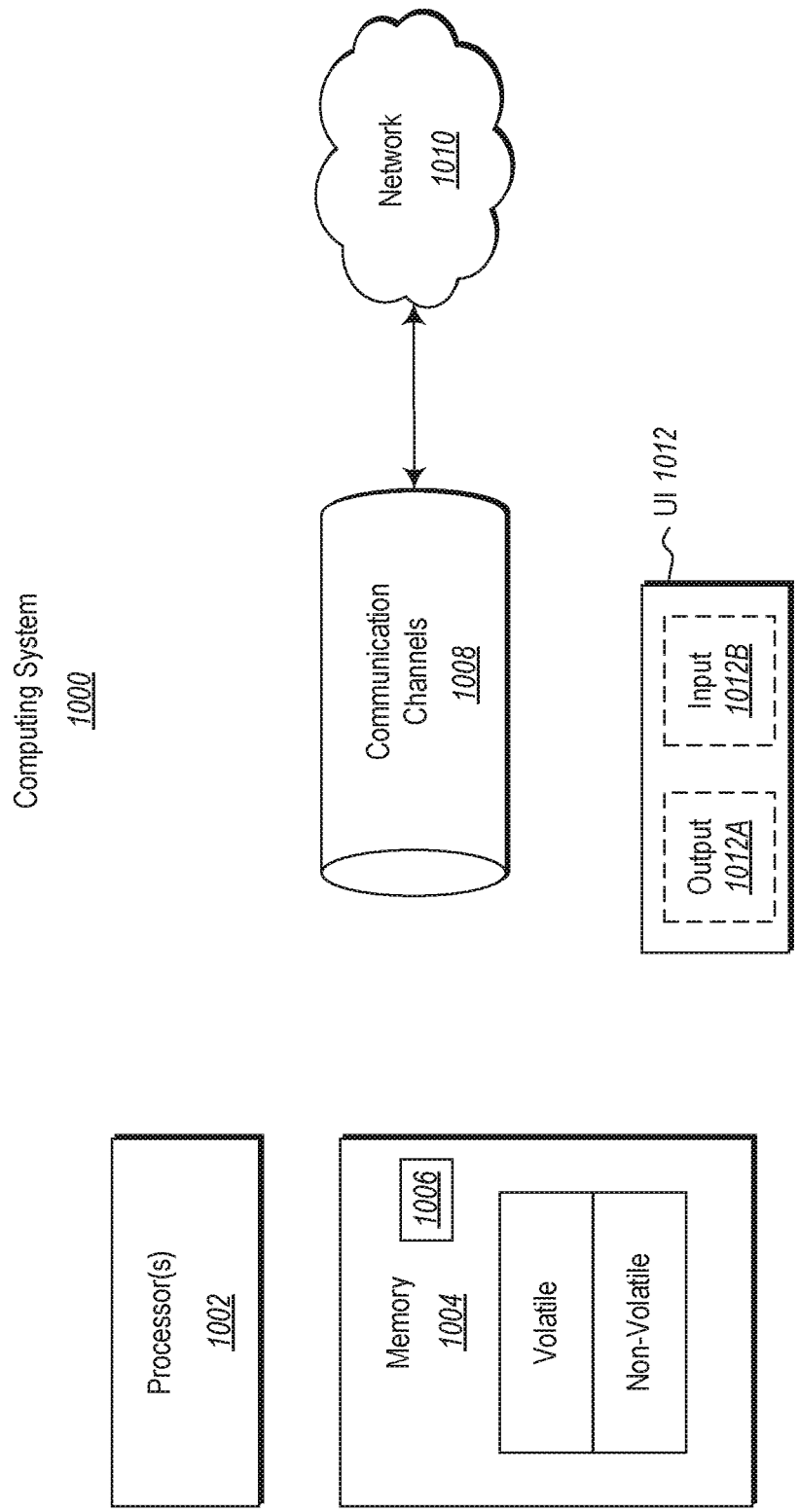
FIG. 10 illustrates an example computing system in which the principles described herein may be employed.

As illustrated in FIG. 10, in its most basic configuration, a computing system 1000 includes at least one hardware processing unit 1002 and memory 1004. The processing unit 1002 includes a general-purpose processor. Although not required, the processing unit 1002 may also include a field programmable gate array (FPGA), an application specific integrated circuit (ASIC), or any other specialized circuit. In one embodiment, the memory 1004 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1000 also has thereon multiple structures often referred to as an "executable component". For instance, the memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1004 of the computing system 1000. Computing system 1000 may also contain communication channels 1008 that allow the computing system 1000 to communicate with other computing systems over, for example, network 1010.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, virtual or augmented reality, holograms and so forth. Examples of input mechanisms 1012B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that generates a response to a task prompt representing a task to perform on declarative code, said computing system comprising:
   one or more processors; and
   one or more hardware storage devices that store instructions that are executable by the one or more processors to cause the computing system to:
      access declarative code that includes declarations about data;
      access a task prompt representing a task to perform on the declarative code;
      cause a user interface to simultaneously display the declarative code and the task prompt;
      access input imperative code, which is generated by a conversion of at least a portion of the declarative code and at least a portion of the task prompt into imperative code that establishes a data structure representing the declarative code and that defines an array of values for data declared in the declarative code, wherein the input imperative code is generated in a manner such that the input imperative code includes an imperative code comment line that recites the task prompt;
      cause at least a portion of the input imperative code to be provided as input to a language model;
      access output imperative code generated by the language model in response to the language model operating upon the input imperative code;
      access a response to the task prompt, where the response is generated by a conversion of at least a portion of the output imperative code; and
      update the declarative code as presented within the user interface such that the user interface simultaneously displays the updated declarative code, which is updated based on the response, and the task prompt.

2. The computing system in accordance with claim 1, the declarative code comprising a spreadsheet.

3. The computing system in accordance with claim 1, the declarative code comprising a database.

4. The computing system in accordance with claim 1, the declarative code comprising a web page.

5. The computing system in accordance with claim 1, the declarative code comprising a collection of rules.

6. The computing system in accordance with claim 1, the result comprising a portion of the output imperative code.

7. The computing system in accordance with claim 1, the result comprising a modification of the declarations about the data.

8. The computing system in accordance with claim 1, the result comprising an addition of a declaration.

9. A computer-implemented method for generating a response to a task prompt representing a task to perform on declarative code, the method comprising:

accessing declarative code that includes declarations about data;

accessing a task prompt representing a task to perform on the declarative code;

causing a user interface to simultaneously display the declarative code and the task prompt;

accessing input imperative code, which is generated by a conversion of at least a portion of the declarative code and at least a portion of the task prompt into imperative code that establishes a data structure representing the declarative code and that defines an array of values for data declared in the declarative code, wherein the input imperative code is generated in a manner such that the input imperative code includes an imperative code comment line that recites the task prompt;

causing at least a portion of the input imperative code to be provided as input to a language model;

accessing output imperative code generated by the language model in response to the language model operating upon the input imperative code;

accessing a response to the task prompt, where the response is generated by a conversion of at least a portion of the output imperative code; and updating the declarative code as presented within the user interface such that the user interface simultaneously displays the updated declarative code, which is updated based on the response, and the task prompt.

10. The computer-implemented method in accordance with claim 9, the declarative code comprising a spreadsheet.

11. The computer-implemented method in accordance with claim 10, the response comprising an additional column in the spreadsheet.

12. The computer-implemented method in accordance with claim 10, the response comprising an additional row in the spreadsheet.

13. The computer-implemented method in accordance with claim 10, the response comprising an assignment of a value to one or more cells of the spreadsheet.

14. The computer-implemented method in accordance with claim 10, the response comprising an assignment of a formula to one or more cells of the spreadsheet.

15. The computer-implemented method in accordance with claim 9, further comprising:

determining that there are multiple responses generated by the language model; and filtering the responses generated by the language model using a filtering criteria.

16. The computer-implemented method in accordance with claim 15, the filtering criteria comprising whether or not the response runs.

17. The computer-implemented method in accordance with claim 16, the filtering criteria comprising user-specified criteria.

18. The computer-implemented method in accordance with claim 9, further comprising:

determining that there are multiple responses generated by the language model; and sorting the responses generated by the language model using a sorting criteria.

19. The computer-implemented method in accordance with claim 18, the sorting criteria comprising a confidence score generated from metadata of a plurality of tokens of the output imperative code.

20. One or more hardware storage devices that store instructions that are executable by one or more processors to cause the one or more processors to:

access declarative code that includes declarations about data;

access a task prompt representing a task to perform on the declarative code;

cause a user interface to simultaneously display the declarative code and the task prompt;

access input imperative code, which is generated by a conversion of at least a portion of the declarative code and at least a portion of the task prompt into imperative code that establishes a data structure representing the declarative code and that defines an array of values for data declared in the declarative code, wherein the input imperative code is generated in a manner such that the input imperative code includes an imperative code comment line that recites the task prompt;

cause at least a portion of the input imperative code to be provided as input to a language model;

access output imperative code generated by the language model in response to the language model operating upon the input imperative code;

access a response to the task prompt, where the response is generated by a conversion of at least a portion of the output imperative code; and update the declarative code as presented within the user interface such that the user interface simultaneously displays the updated declarative code, which is updated based on the response, and the task prompt.

* * * * *